United States Patent
Moon et al.

(10) Patent No.: US 7,535,545 B2
(45) Date of Patent: May 19, 2009

(54) METHOD OF MANUFACTURING CHOLESTERIC LIQUID CRYSTAL (CLC) COLOR FILTER LAYER AND TRANSMISSIVE LIQUID CRYSTAL DISPLAY DEVICE HAVING THE CLC COLOR FILTER LAYER ACCORDING TO THE METHOD

(75) Inventors: Jong-Weon Moon, Annyang-si (KR); Jae-Hong Hur, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 59 days.

(21) Appl. No.: 10/875,315

(22) Filed: Jun. 25, 2004

(65) Prior Publication Data
US 2004/0263723 A1   Dec. 30, 2004

(30) Foreign Application Priority Data
Jun. 26, 2003 (KR) .................. 10-2003-0041834

(51) Int. Cl.
*G02F 1/13* (2006.01)
(52) U.S. Cl. .................. 349/187; 349/185; 349/106
(58) Field of Classification Search ......... 349/106–109, 349/187, 185
See application file for complete search history.

(56) References Cited

U.S. PATENT DOCUMENTS

| | | | | |
|---|---|---|---|---|
| 5,469,278 A | * | 11/1995 | Takahara et al. | 349/86 |
| 5,668,614 A | * | 9/1997 | Chien et al. | 349/115 |
| 6,476,890 B1 | * | 11/2002 | Funahata et al. | 349/113 |
| 2001/0030720 A1 | * | 10/2001 | Ichihashi | 349/106 |
| 2002/0167628 A1 | | 11/2002 | Yoon | |
| 2004/0119934 A1 | * | 6/2004 | Park et al. | 349/187 |

FOREIGN PATENT DOCUMENTS

KR   10-2003-0048352   6/2003

* cited by examiner

*Primary Examiner*—David Nelms
*Assistant Examiner*—Lucy P Chien
(74) *Attorney, Agent, or Firm*—McKenna Long & Aldridge LLP

(57) ABSTRACT

A transmissive liquid crystal display device includes first and second substrates spaced apart and facing each other, a cholesteric liquid crystal (CLC) color filter layer on an inner surface of the first substrate, the CLC color filter layer including first areas for displaying R, G and B and second areas between adjacent first areas, a first polarizer on an outer surface of the first substrate, a backlight unit on the first polarizer, a retardation plate on an outer surface of the second substrate, a second polarizer on the retardation plate, and a liquid crystal layer between the first and second substrates.

1 Claim, 5 Drawing Sheets

METHOD OF MANUFACTURING CHOLESTERIC LIQUID CRYSTAL (CLC) COLOR FILTER LAYER AND TRANSMISSIVE LIQUID CRYSTAL DISPLAY DEVICE HAVING THE CLC COLOR FILTER LAYER ACCORDING TO THE METHOD

The present invention claims the benefit of Korean Patent Application No. 2003-41834, filed in Korea on Jun. 26, 2003, which is hereby incorporated by reference for all purposes as of fully set forth herein.

BACKGROUND OF THE INVENTION

1. Field of the Invention

The present invention relates to a liquid crystal display (LCD) device and more particularly, to a method of manufacturing a cholesteric liquid crystal (CLC) color filter layer and a transmissive liquid crystal display device incorporating the CLC color filter layer manufactured according to the method.

2. Discussion of the Related Art

A liquid crystal display (LCD) device has been in the spotlight as a valuable, next generation display device because of its low power consumption and good portability.

An active matrix liquid crystal display (AMLCD) device, which includes thin film transistors as switching devices for each of a plurality of pixels, has been widely used because of its high resolution and fast moving images.

Because the LCD device is not luminescent, it needs an additional light source in order to display images. In general, the LCD device has a backlight behind a liquid crystal panel as a light source, and such an LCD is usually referred to as a transmissive LCD device. In the transmissive type, light incident from the backlight penetrates the liquid crystal panel, and the amount of the transmitted light is controlled according to the alignment of liquid crystal molecules. Because the transmissive LCD device uses the backlight as a light source, it can display a bright image in dark surroundings. However, the amount of the transmitted light is very small for the amount of light incident from the backlight. That is, because only about 7% of the light incident from the backlight is transmitted through the liquid crystal panel, the brightness of the backlight should be increased in order to increase the brightness of the LCD device. Consequently, the transmissive LCD device has high power consumption due to the backlight.

To solve the problems in the transmissive LCD device, a reflective LCD device has been proposed. In the reflective LCD device, sunlight or artificial light is used as a light source of the LCD device. The light incident from the outside is reflected at a reflective plate of the LCD device according to the arrangement of the liquid crystal molecules. Since there is no backlight, the reflective LCD device has much lower power consumption than the transmissive LCD device. By the way, the reflective LCD device generally includes an absorptive color filter layer, which is made of pigments or dyes, the same as the transmissive LCD device. The reflective LCD device also has a disadvantage of low light transmittance due to the absorptive color filter layer.

To improve the light transmittance in the reflective LCD device, a cholesteric liquid crystal (CLC) color filter has been researched and developed. As the CLC color filter selectively reflects and transmits light, the CLC color filter can emit light of high purity in color. Additionally, the CLC color filter functions both as a color filter layer and as a reflector. Therefore, since the reflective LCD device including the CLC color filter does not require an additional reflector, the number and duration of manufacturing processes are decreased and image quality is improved.

Liquid crystal molecules of the CLC are arranged in a helical structure. The helical structure is characterized by a helical direction and a pitch, which is a cycle of the helical structure. A color tone of light reflected by the CLC depends on the pitch.

The CLC color filter may be used in a transmissive LCD device. A transmissive LCD device including a CLC color filter will be explained in detail with reference to the following figures.

FIG. 1 is a plan view of a transmissive LCD device including a cholesteric liquid crystal (CLC) color filter according to the related art. As illustrated in the figure, first and second substrates 10 and 30 are spaced apart from and face each other. A cholesteric liquid crystal (CLC) color filter layer 12, which includes a first cholesteric liquid crystal (CLC) layer 12a and a second CLC layer 12b sequentially deposited, is formed on an inner surface of the first substrate 10. A common electrode 13 is formed on the CLC color filter layer 12.

The first and second CLC layers 12a and 12b are divided into sub pixels $P_R$, $P_G$ and $P_B$, each of which is a minimum unit for displaying an image. The first and second CLC layers 12a and 12b of each sub pixel $P_R$, $P_G$ and $P_B$ have different helical pitches, and reflect light of colors corresponding to the helical pitches, respectively, wherein the helical pitches do not correspond to a displayed color at the sub pixel $P_R$, $P_G$ and $P_B$. For example, at a red (R) sub pixel $P_R$, the first CLC layer 12a may have the helical pitch corresponding to green (G) and the second CLC layer 12b may have the helical pitch corresponding to blue (B). At a green sub pixel $P_G$, the first CLC layer 12a may have the pitch corresponding to red and the second CLC layer 12b may have the pitch corresponding to blue. At a blue sub pixel $P_B$, the first CLC layer 12a may have the pitch corresponding to red and the second CLC layer 12b may have the pitch corresponding to green. That is, the first CLC layer 12a may be controlled to have G, R and R pitches in order at the sub pixels $P_R$, $P_G$ and $P_B$ and the second CLC layer 12b may be controlled to have B, B and G pitches sequentially at the sub pixels $P_R$, $P_G$ and $P_B$.

A first polarizer 14 is disposed on an outer surface of the first substrate 10. The first polarizer 14 acts as a CLC polarizer and selectively reflects one of left-handed circularly polarized light and right-handed circularly polarized light.

An array element layer 32 is formed on an inner surface of the second substrate 30. Although not shown in the figure, the array element layer 32 includes a thin film transistor as a switching element and a pixel electrode connected to the thin film transistor at each sub pixel $P_R$, $P_G$ and $P_B$. A hologram diffusion plate 34 is formed on the array element layer 32.

A liquid crystal layer 50 is interposed between the common electrode 13 and the hologram diffusion plate 34.

A retardation plate 36 and a second polarizer 38 are sequentially arranged on an outer surface of the second substrate 30. The retardation plate 36 changes circularly polarized light into linearly polarized light or changes linearly polarized light into circularly polarized light. The retardation plate 36 may be a quarter wave plate (QWP). The second polarizer 38 is a linear polarizer, and transmits linearly polarized light corresponding to a light transmission axis thereof.

When a Bragg's reflection condition is satisfied at the CLC color filter layer 12, desired light properties may be obtained. Ideal selective reflection/transmission effects may be expected for light less than 10 degrees with respect to a normal line to the CLC color filter layer 12.

The Bragg's reflection condition may be explained more in detail. If X-ray is incident on a lattice plane of a crystal, interference patterns are formed by the interference of the X-ray reflected at the lattice plane. If a distance between adjacent lattices is d, and an incident angle of the X-ray is 90-θ, the path difference for the X-rays reflected at a first plane and a second plane is 2d sin θ. If the path difference is an integer number of a wavelength of the X-ray, the reflected waves are strengthened by the reinforcement interference.

$$2d \sin \theta = m\lambda (m=1, 2, 3, \ldots)$$

If light having an incidence angle quarter than 10 degrees is incident on the CLC color filter layer 12, the reflected light has a wavelength different from a designed wavelength of the CLC color filter layer 12 according to the Bragg's condition. Thus, color purity of transmitted light is lowered.

Accordingly, in the related art transmissive LCD device, a high light-concentrating backlight, which may be referred to as a high collimating backlight, that concentrates light within about 10 degrees with respect to a line normal to a standard plane is widely used as a light source.

The high light-concentrating backlight unit 16 is disposed on the first polarizer 14, and more particularly, on a rear side of the first polarizer 14. The high light-concentrating backlight unit 16 includes a light-concentrating backlight 16b and a light-concentrating sheet 16a over the light-concentrating backlight 16b. Therefore, the high light-concentrating backlight unit 16 concentrates light in desired angles. That is, incident light is concentrated by the high light-concentrating backlight unit 16 to have an incident angle within less than 10 degrees, and the concentrated light transmits the CLC color filter layer, whereby the light has a corresponding color. Then, the light emitted through the hologram diffusion plate 34 should have viewing angles of about 140 degrees.

However, although the high light-concentrating backlight unit may be used, it is difficult to have the incident angle with the value less than about 10 degrees. Accordingly, bright color properties may be hard to obtain in the transmissive LCD device including the high light-concentrating backlight unit.

SUMMARY OF THE INVENTION

Accordingly, the present invention is directed to a method of manufacturing a cholesteric liquid crystal (CLC) color filter layer and a transmissive liquid crystal display device incorporating the CLC color filter layer manufactured according to the method that substantially obviates one or more of problems due to limitations and disadvantages of the related art.

An advantage of the present invention is to provide a transmissive liquid crystal display device having the CLC color filter layer that improves color properties without additional high light-concentrating backlight unit.

Another advantage of the present invention is to provide a method of manufacturing a cholesteric liquid crystal (CLC) color filter layer that improves color properties without additional high light-concentrating backlight unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transmissive liquid crystal display device includes first and second substrates spaced apart and facing each other, a cholesteric liquid crystal (CLC) color filter layer on an inner surface of the first substrate, the CLC color filter layer including first areas for displaying R, G and B and second areas between adjacent first areas, a first polarizer on an outer surface of the first substrate, a backlight unit on the first polarizer, a retardation plate on an outer surface of the second substrate, a second polarizer on the retardation plate, and a liquid crystal layer between the first and second substrates.

In another aspect, a method of manufacturing a cholesteric liquid crystal (CLC) color filter layer for a transmissive liquid crystal display device includes coating a CLC material on a substrate, the CLC material including ultraviolet (UV) absorbent, disposing a mask over the CLC material and exposing the CLC material to UV light, the UV light having different intensities corresponding to portions of the mask, each portion of the mask including a plurality of transmissive areas and a plurality of half transmissive areas alternatively arranged, forming a CLC color filter layer including R, G and B sub pixels according to the intensities of the UV light, each sub pixel having a plurality of first areas displaying R, G and B colors and a plurality of second areas reflecting all R, G and B light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
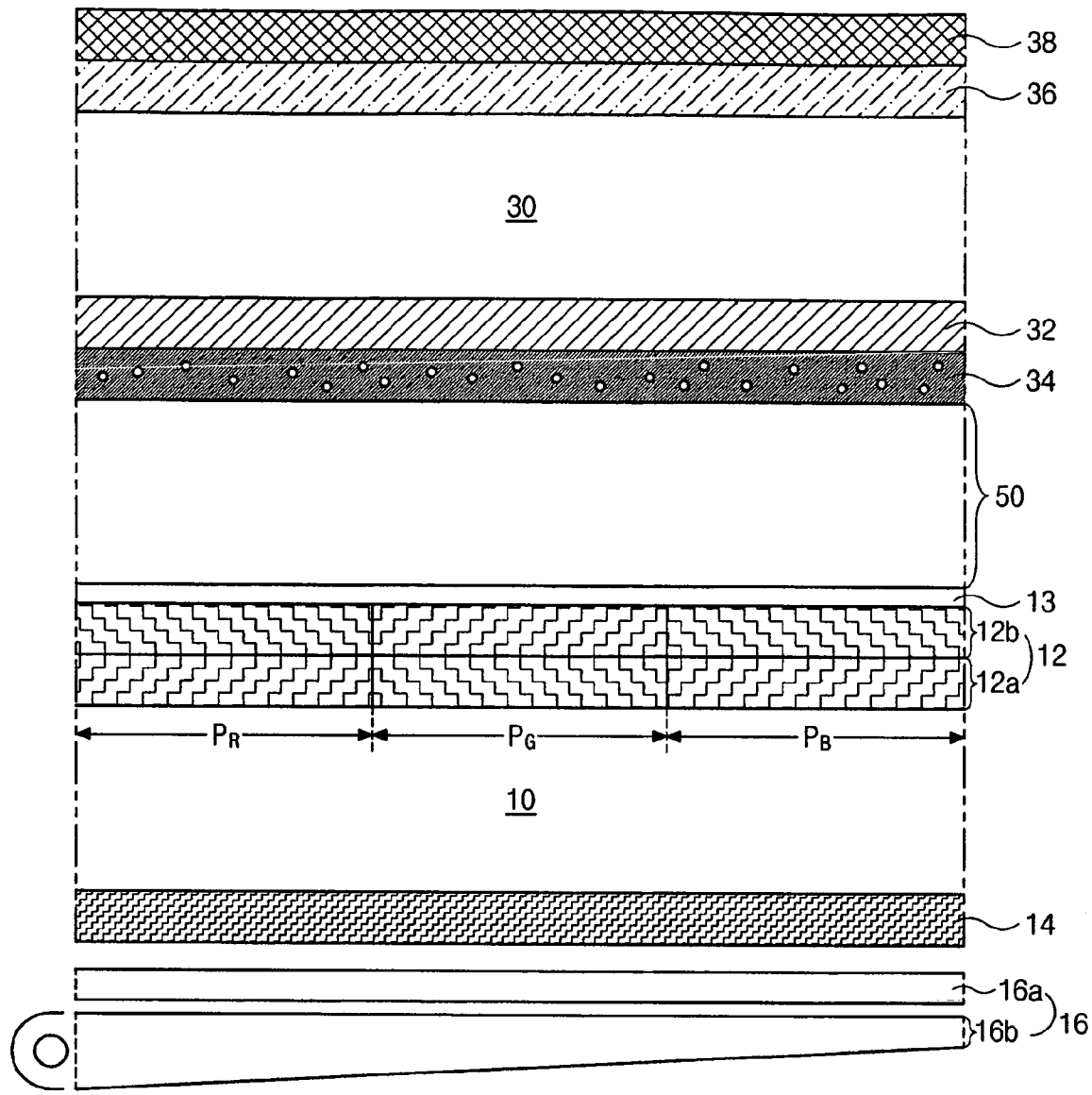
FIG. 1 is a plan view of a transmissive liquid crystal display (LCD) device including a cholesteric liquid crystal (CLC) color filter according to the related art.
Figure 2:
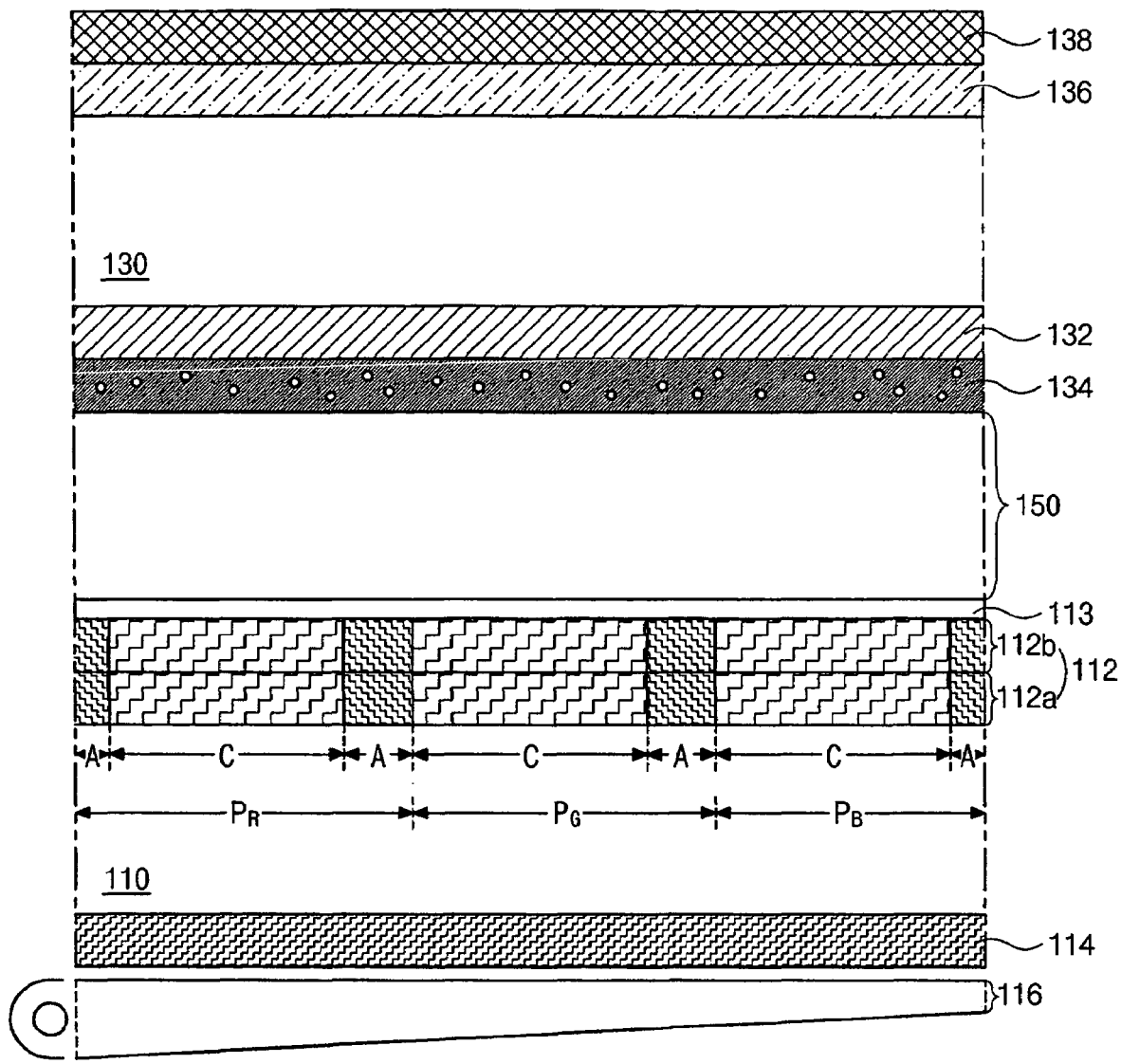
FIG. 2 is a schematic cross-sectional view of a transmissive liquid crystal display (LCD) device including a cholesteric liquid crystal (CLC) color filter according to an exemplary embodiment of the present invention.

FIG. 2 is a schematic cross-sectional view of a transmissive liquid crystal display (LCD) device including a cholesteric liquid crystal (CLC) color filter according to an exemplary embodiment of the present invention. As illustrated in FIG. 2, a first substrate 110 and a second substrate 130 are spaced apart from and face each other. A cholesteric liquid crystal (CLC) color filter layer 112, which includes a first CLC layer 112a and a second CLC layer 112b sequentially deposited, is formed on an inner surface of the first substrate 110. A common electrode 113 is formed on the CLC color filter layer 112. The first and second CLC layers 112a and 112b include a polarization area A, which reflects light of all wavelengths, and a color displaying area C, which selectively transmits light corresponding to R, G and B, in each of red (R), green (G) and blue (B) sub pixels $P_R$, $P_G$ and $P_B$.

A thickness and a width of the first and second CLC layers 112a and 112b in the color displaying area C may be determined such that a triangle made by the thickness and the width of the first and second CLC layers 112a and 112b in the color displaying area C has an angle θ less than 10 degrees with respect to a normal line to the standard plane. This angle θ is represented in FIG. 3B.

If light having an incident angle more than 10 degrees is incident on the color displaying area C, the light enters the polarization area A and then is reflected. On the other hand, if light having an incident angle less than 10 degrees is incident on the color displaying area C, the light is selectively transmitted or reflected according to the helical pitch of the color displaying area C, and thus desirable color light is transmitted.

Although a size of an area where light is transmitted is decreased, the light reflected at the polarization area A is recycled to thereby increase brightness of the device as compared with a conventional LCD device.

The first and second CLC layers 112a and 112b may include a plurality of polarization areas and color displaying areas in each sub pixel $P_R$, $P_G$ and $P_B$. The CLC color filter layer 112 may include an ultraviolet (UV) absorbent and the polarization area may reflect light of substantially all wavelengths.

An array element layer 132 and a hologram diffusion plate 134 are sequentially formed on an inner surface of the second substrate 130. Although not shown in the figure, the array element layer 132 includes a thin film transistor as a switching element and a pixel electrode connected to the thin film transistor at each sub pixel $P_R$, $P_G$ and $P_B$. Although the hologram plate 134 is formed on the array element layer 132 in this embodiment, the hologram diffusion plate 134 may be formed in other positions.

A liquid crystal layer 150 is interposed between the common electrode 113 and the hologram diffusion plate 134.

A first polarizer 114 is formed on an outer surface of the first substrate 110. The first polarizer 114 selectively reflects one of left-handed circularly polarized light and right-handed circularly polarized light. The first polarizer 114 may be a CLC polarizer using CLC.

A retardation plate 136 and a second polarizer 138 are sequentially formed on an outer surface of the second substrate 130. The retardation plate 136 changes circularly polarized light into linearly polarized light or changes linearly polarized light into circularly polarized light. Thus, if light passing through the liquid crystal layer 150 is circularly polarized, the circularly polarized light is changed into linearly polarized light through the retardation plate 136. The retardation plate 136 may be a quarter wave plate (QWP). The second polarizer 138 is a linear polarizer, and transmits linearly polarized light corresponding to a light transmission axis thereof.

A backlight unit 116 is disposed over the first polarizer 114. The backlight unit 116 may have a general structure. In this embodiment, because the CLC color filter layer 112 has the polarization area A, the high light-concentrating backlight unit may be omitted.

In the transmissive LCD device of the present invention, color properties may be improved by controlling the thickness of the CLC color filter layer and the width of the color displaying area. Therefore, because the high light-concentrating backlight unit may be omitted and the general backlight unit can be used, manufacturing costs may be decreased and processing efficiencies may be improved.

Figure 3A:
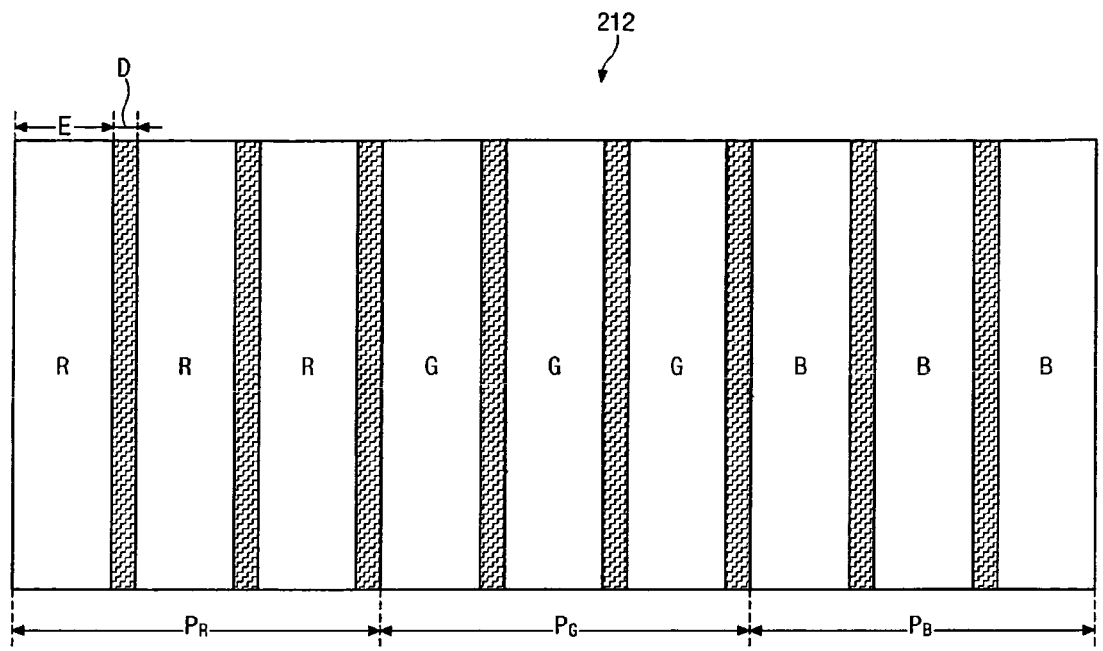
FIGS. 3A and 3B illustrate a cholesteric liquid crystal (CLC) color filter layer for a transmissive LCD device according to the present invention.
Figure 3B:
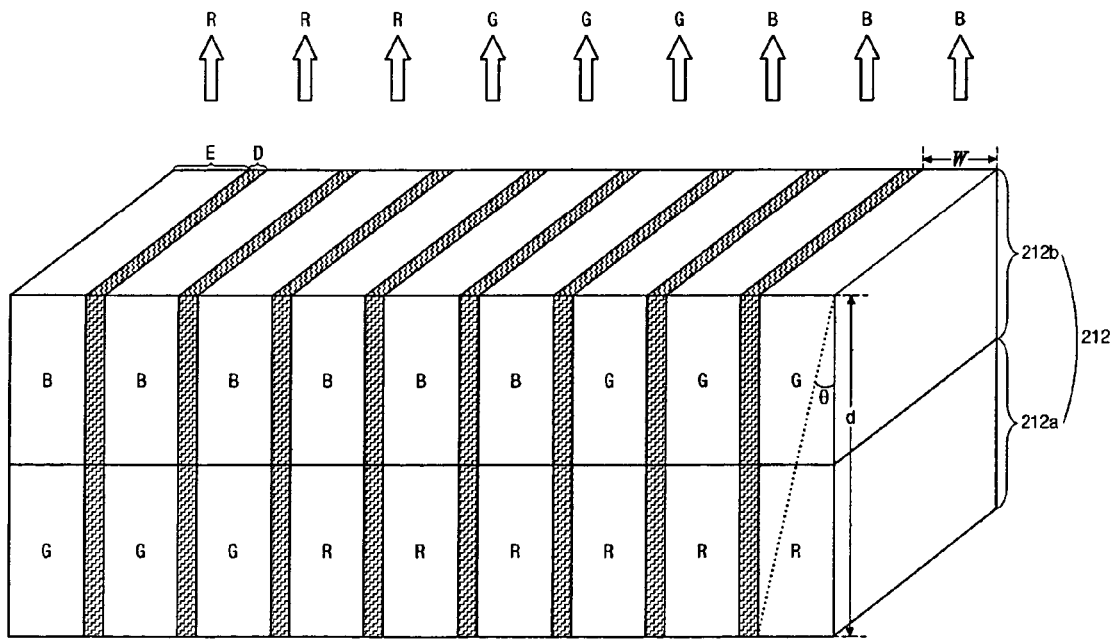

FIGS. 3A and 3B illustrate a cholesteric liquid crystal (CLC) color filter layer for a transmissive LCD device according to the present invention in detail. FIG. 3A is a plan view of the CLC color filter layer, and FIG. 3B is a perspective view of the CLC color filter layer.

As illustrated in the figures, a CLC color filter layer 212 includes a first CLC layer 212a and a second CLC layer 212b sequentially layered. The first and second CLC layers 212a and 212b are divided into portions corresponding to sub pixels $P_R$, $P_G$ and $P_B$, where red (R), green (G) and blue (B) lights are transmitted, respectively. The first and second CLC layers 212a and 212b also include a plurality of polarization areas D and a plurality of color displaying areas E, which are alternatively arranged with each other, in each sub pixel $P_R$, $P_G$ and $P_B$.

Here, if a thickness of the first and second CLC layer 212a and 212b is defined as d and a width of one color displaying area E is defined as W, a triangle made by the thickness d and the width W may have an angle θ within a range of about 10 degrees to about 15 degrees where θ is $\tan^{-1}(W/d)$.

The polarization areas D are disposed at both sides of each color displaying area E. Since the angle θ is within a range of about 10 degrees to about 15 degrees, incident light having an angle of more than about 10 degrees to about 15 degrees with respect to the normal line to the CLC color filter layer 212 goes into the polarization area D passing through the color displaying area E, and then is reflected in the polarization areas D. The polarization areas D may have a narrower width than the color displaying areas E. For example, the polarization areas D may have a width within a range of about 1 μm to about 2 μm.

Figure 4:
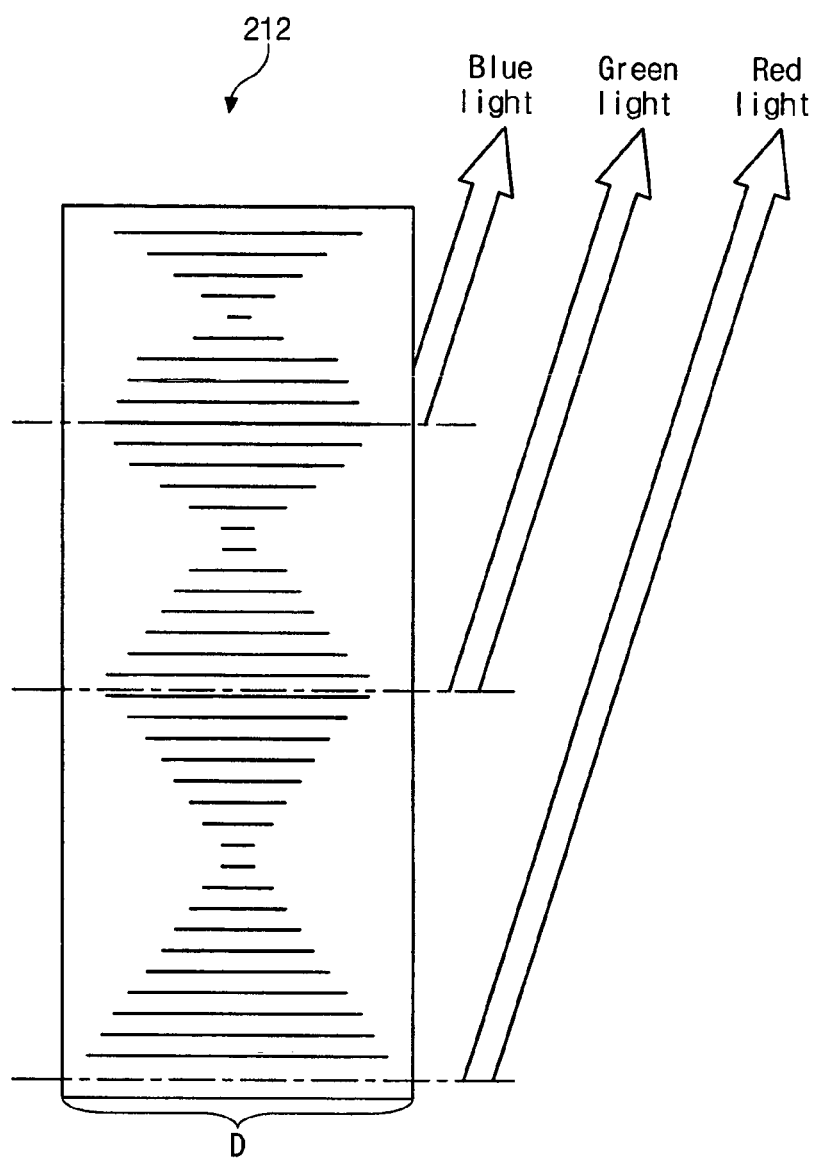
FIG. 4 is a view illustrating an enlarged portion of the CLC color filter layer of FIG. 3B, and corresponds to one polarization area of a CLC layer.

FIG. 4 is a view illustrating an enlarged portion of the CLC color filter layer of FIG. 3B, and corresponds to one polarization area of a CLC layer. FIG. 4 illustrates a whole wavelength mechanism.

In FIG. 4, the CLC color filter layer 212 may be made of CLC material including ultraviolet (UV) absorbent. The polarization area D of the CLC color filter layer 212 may be formed by exposing the CLC layer to light such as UV using a half-tone mask, which can control intensities of light. The helical pitches of the CLC may decrease according as the intensity of exposing light increases. The UV intensity decreases while passing through the CLC layer including UV absorbent. Thus, a lower portion of the polarization area D has a long helical pitch, a middle portion of the polarization area D has a middle helical pitch, and an upper portion of the polarization area D has a short helical pitch. As illustrated, the lower, middle and upper portions of the polarization area D reflect red, green and blue light, respectively. However, the order of the portions reflecting light may be different. Since the polarization area D includes three portions having different helical pitches, all incident light on the polarization area D is reflected substantially at the polarization area D.

Figure 5A:
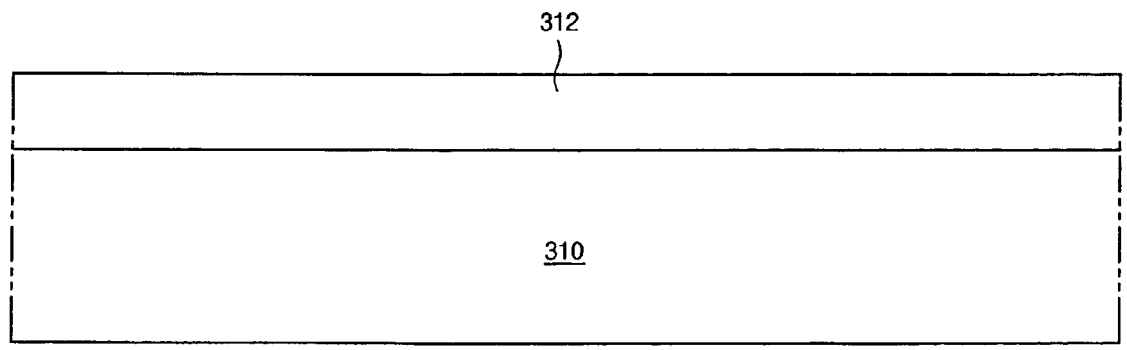
FIGS. 5A and 5B illustrate a manufacturing process of a CLC color filter layer for a transmissive LCD device according to the present invention.
Figure 5B:
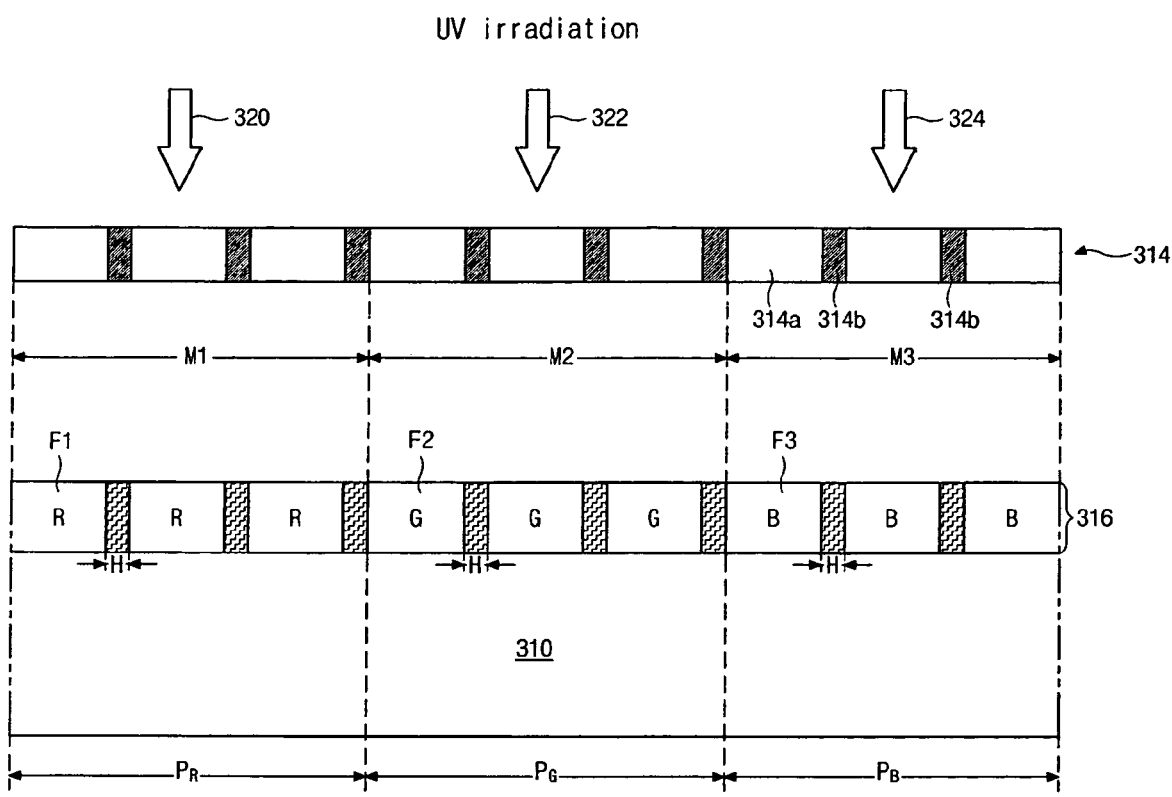

FIGS. 5A and 5B illustrate a manufacturing process of a CLC color filter layer for a transmissive LCD device according to the present invention.

In FIG. 5A, a CLC layer 312 is coated on a substrate 310. The CLC layer 312 includes UV absorbent and has helical pitches, which decrease according to an increasing applied UV intensity.

In FIG. 5B, a mask 314 is disposed over the CLC layer 312 of FIG. 5A, and then UV exposure is performed. The mask 314 includes a plurality of transmissive portions 314a and a plurality of half-transmissive portions 314b, which are alternatively arranged with each other. The mask 314 is divided into first, second and third areas M1, M2 and M3. UV light is also divided into first, second, and third UV light 320, 322 and 324 corresponding to respective areas M1, M2 and M3 of the mask 314. The third UV light 324 may have the highest intensity and the second UV light 322 may have higher intensity than the first UV light 320.

In the present invention, UV light having different intensities at each area is irradiated using one mask.

A CLC color filter layer 316 is formed through the above steps. The CLC color filter layer 316 has R, G and B color areas F1, F2 and F3 and polarization areas H. Each polarization area H is disposed between adjacent color areas F1, F2 and F3, and has all R, G and B helical pitches.

More particularly, R color area F1 reflects light having wavelengths of about 580 nm to about 680 nm, G color area F2 reflects light having wavelengths of about 480 nm to about 580 nm, and B color area F3 reflects light having wavelengths of about 400 nm to 480 nm. The polarization area H is exposed to UV light that passes through the half transmissive portions 314b, and reflects light having wavelengths of about 380 nm to 780 nm.

Thus, the CLC color filter layer 316 is divided into R, G and B sub pixels $P_R$, $P_G$ and $P_B$. For example, R sub pixel $P_R$ has a plurality of R color areas F1 and a plurality of polarization areas H, each of which is disposed between adjacent R color areas F1.

The CLC layer is used as a lower layer and another CLC layer may be formed on the lower CLC layer by the above process, whereby a CLC color filter layer having a double-layered structure may be used in a transmissive LCD device.

In the present invention, the CLC color filter layer includes the color displaying areas and the polarization areas. Thus, although the high light-concentrating backlight unit is not used, improved color properties may be obtained. In addition, the color displaying areas of R, G and B and the polarization areas reflecting light of all wavelengths may be formed through one exposing process, manufacturing processes may be reduced and productivity may be increased.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A manufacturing method of a cholesteric liquid crystal (CLC) color filter layer for a transmissive liquid crystal display device, comprising:

coating a CLC material on a substrate, the CLC material including ultraviolet (UV) absorbent;

disposing a mask over the CLC material and exposing the CLC material to UV light, the UV light having different intensities corresponding to portions of the mask, each portion of the mask including a plurality of transmissive areas and a plurality of half transmissive areas alternatively arranged;

forming a CLC color filter layer including R, G and B sub pixels according to the intensities of the UV light, each sub pixel having a plurality of first areas displaying and a plurality of second areas reflecting all R, G and B light, wherein the CLC color filter layer includes a first CLC layer and a second CLC layer, which have respective pitches reflecting different colors such that a color of emitted light is different from the reflected colors, and wherein each first area of the CLC color filter has a width and a thickness such that a triangle made by the width and the thickness has an angle adjacent to the thickness side of the triangle within a range of about 10 degrees to about 15 degrees.

* * * * *